United States Patent
Clough et al.

(10) Patent No.: US 10,354,080 B2
(45) Date of Patent: Jul. 16, 2019

(54) FACILITATING OFFLINE OR OTHER CONTEMPORANEOUS EDITING OF TABULAR DATA

(71) Applicant: WINSHUTTLE LLC, Bothell, WA (US)

(72) Inventors: Gary Clough, Carlsbad, CA (US); Paul W. Mott, San Diego, CA (US); Heather Oebel, Vancouver (CA); Vikram Chalana, Bothell, WA (US)

(73) Assignee: WINSHUTTLE, LLC, Bothell, WA (US)

(*) Notice: Subject to any disclaimer, the term of this patent is extended or adjusted under 35 U.S.C. 154(b) by 55 days.

(21) Appl. No.: 15/154,871

(22) Filed: May 13, 2016

(65) Prior Publication Data

US 2017/0329984 A1 Nov. 16, 2017

(51) Int. Cl.
| | |
|---|---|
| G06F 21/62 | (2013.01) |
| G06F 17/24 | (2006.01) |
| G06F 17/22 | (2006.01) |
| G06F 16/23 | (2019.01) |

(52) U.S. Cl.
CPC ...... *G06F 21/6209* (2013.01); *G06F 16/2329* (2019.01); *G06F 17/2264* (2013.01); *G06F 17/246* (2013.01); *G06F 21/6227* (2013.01)

(58) Field of Classification Search
CPC ............. G06F 21/6227; G06F 21/6209; G06F 17/3056; G06F 17/246
See application file for complete search history.

(56) References Cited

U.S. PATENT DOCUMENTS

| | | | |
|---|---|---|---|
| 8,413,045 B2 | 4/2013 | Lemonik et al. | |
| 8,621,549 B2 | 12/2013 | Lim | |
| 8,719,074 B2 | 5/2014 | Plessis | |
| 8,898,442 B2 | 11/2014 | Stoitsev | |
| 8,924,269 B2 | 12/2014 | Seubert | |
| 8,938,726 B2 | 1/2015 | Barak | |
| 8,983,972 B2 | 3/2015 | Kriebel | |
| 9,058,188 B2 | 6/2015 | Latzina | |
| 9,195,689 B2 | 11/2015 | William | |
| 9,203,874 B2 | 12/2015 | Kadishay | |
| 9,224,163 B2 | 12/2015 | Padmanabhan | |
| 9,275,121 B2 | 3/2016 | Ah-Soon | |
| 9,300,745 B2 | 3/2016 | Ewe | |
| 9,305,066 B2 | 4/2016 | Picht | |
| 2007/0043732 A1* | 2/2007 | Schleimer | G06F 17/3056 |
| 2008/0021732 A1* | 1/2008 | Richards | G06F 19/322 705/2 |

(Continued)

*Primary Examiner* — Ellen Tran
(74) *Attorney, Agent, or Firm* — AEON Law, PLLC; Adam L.K. Philipp; Jonathan E. Olson

(57) ABSTRACT

Methods and systems are presented for identifying user accounts selectively authorized to modify at least respective first and second fields of a data table, obtaining field-dependent validation rules selectively applicable to the respective fields, transmitting spreadsheet files to devices associated with the respective user accounts, filtering user-modified spreadsheet files so that the first field is selectively accepted from the first device and the second field is selectively accepted from the second device, allowing the values of the first and second fields to be edited contemporaneously, and recording an edited version of the data table.

20 Claims, 8 Drawing Sheets

(56) References Cited

U.S. PATENT DOCUMENTS

| | | | | |
|---|---|---|---|---|
| 2013/0262514 A1* | 10/2013 | Everett | ............... | G06F 21/6245 |
| | | | | 707/781 |
| 2014/0115433 A1* | 4/2014 | Berners | ................ | G06F 17/246 |
| | | | | 715/215 |
| 2015/0094046 A1* | 4/2015 | Jung | ................ | H04W 36/0022 |
| | | | | 455/415 |
| 2015/0347540 A1* | 12/2015 | Singh | ................ | G06F 17/30371 |
| | | | | 707/602 |
| 2016/0219027 A1* | 7/2016 | Kaplan | ................... | H04L 63/08 |

* cited by examiner

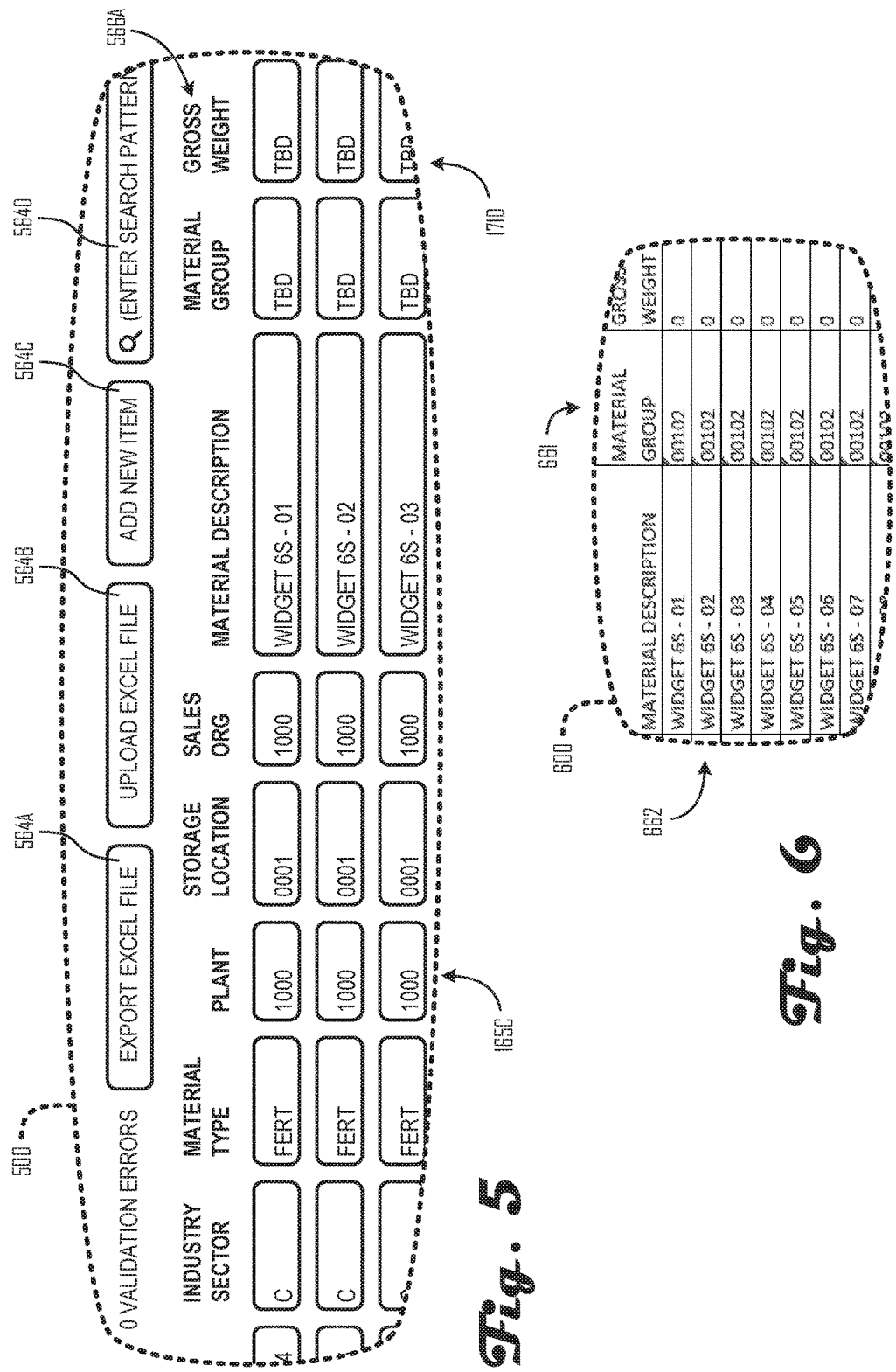

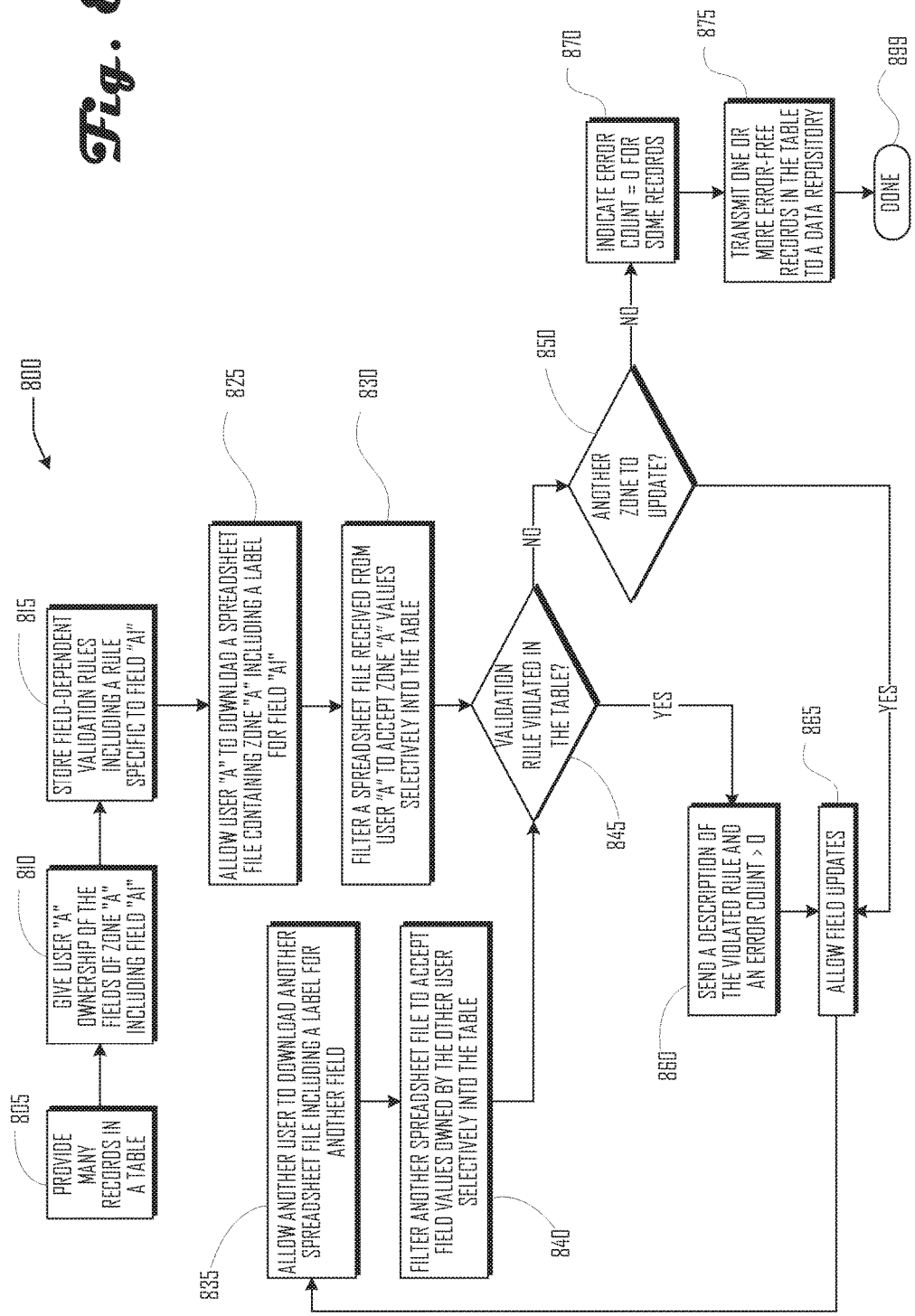

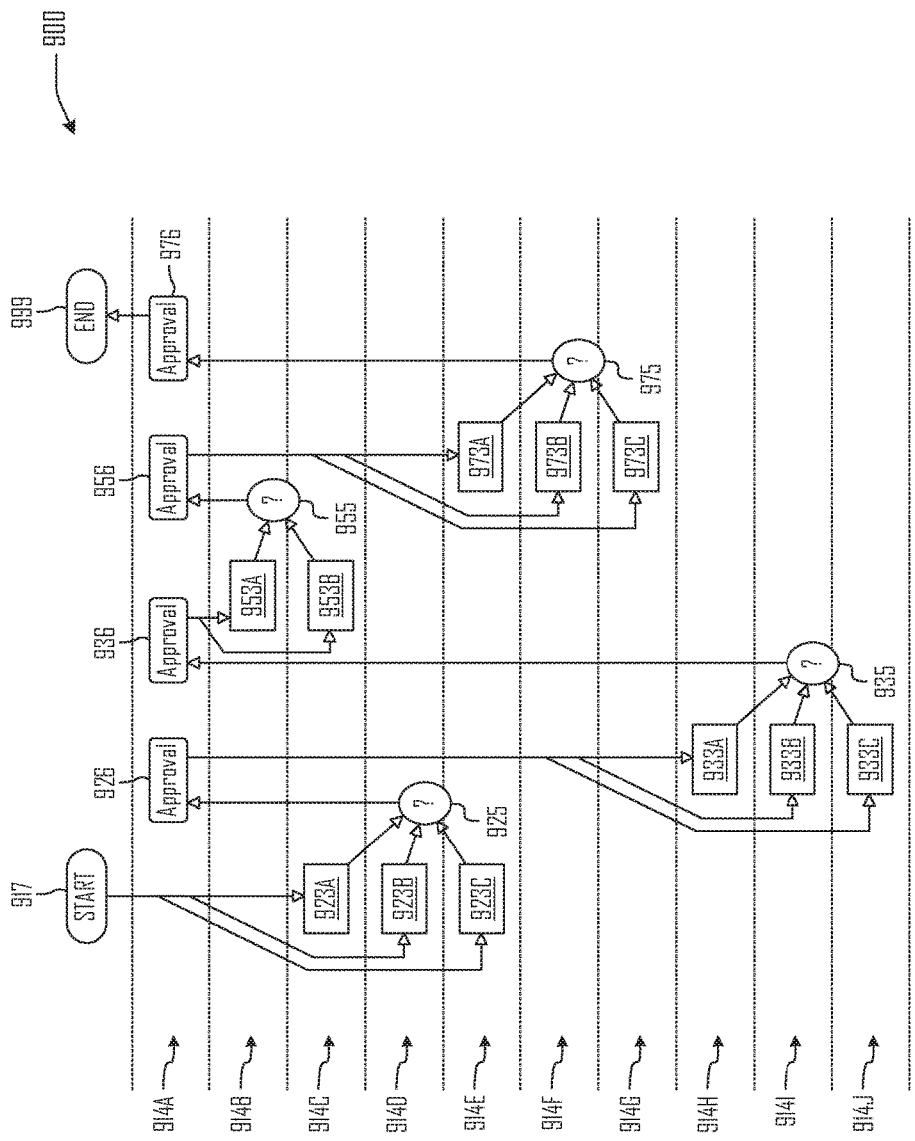

US 10,354,080 B2

FACILITATING OFFLINE OR OTHER CONTEMPORANEOUS EDITING OF TABULAR DATA

FIELD

This disclosure relates to streamlining aggregation of tabular data from widespread contributors.

BRIEF DESCRIPTION OF THE DRAWINGS

FIG. 5 illustrates an instance of a screen display in which one or more technologies may be implemented.

FIG. 6 illustrates a spreadsheet file with content like that of FIG. 5.

FIG. 8 illustrates a flow chart of an information management routine in accordance with at least one embodiment.

FIG. 9 illustrates another flow diagram an information management routine in accordance with at least one embodiment.

DETAILED DESCRIPTION

Figure 1:
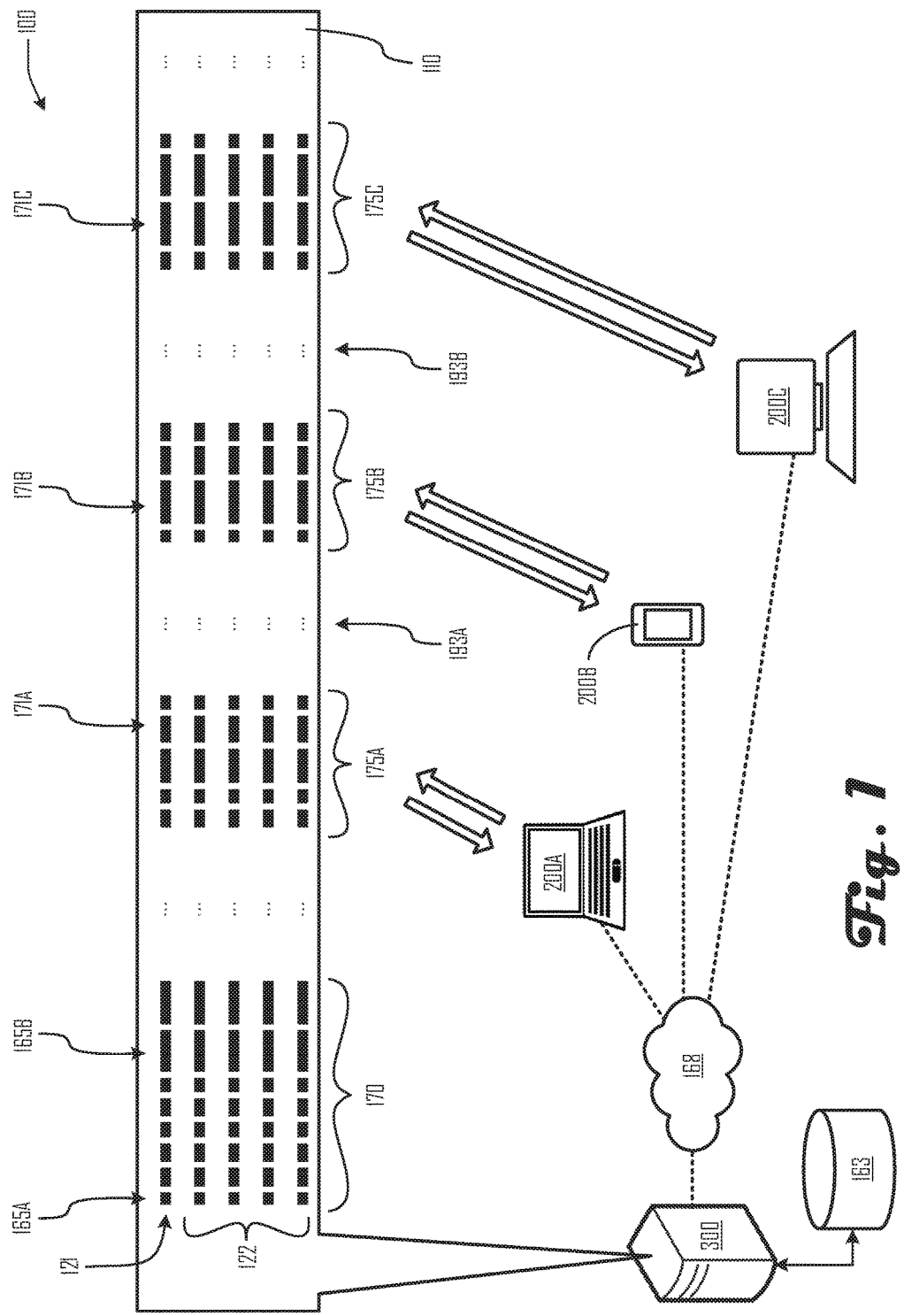
FIG. 1 illustrates an exemplary network topology of an information management system in accordance with various embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Accepted," "additionally," "also," "also," "alternatively," "applicable," "associated," "at," "automatically," "both," "compliant," "concurrent," "conditionally," "configured," "contemporaneously," "describing," "each," "edited," "edited," "field-dependent," "first," "greater," "in," "many," "owned," "partitioned," "plural," "preliminary," "remote," "residing," "second," "selectively," "simultaneous," "to," "updated," "wherein," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. As used herein, the term "contemporaneous" refers to circumstances or events that are concurrent or at least roughly contemporaneous (on the same day, e.g.).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary network topology of an information management system 100 in accordance with various embodiments. A central information management server 300 (see FIG. 3) is in data communication with a plurality of client devices 200A-C (see FIG. 2) via one or more networks 168. In various embodiments, network 168 may include the Internet, one or more local area networks ("LANs"), one or more wide area networks ("WANs"), cellular data networks, and/or other data networks. Network 168 may, at various points, be a wired and/or wireless network. Remote information management server 300 may be in data communication with one or more information management data stores 163.

In various embodiments, any of client devices 200A-C may be networked computing devices having form factors including general purpose computers (including "desktop," "laptop," "notebook," "tablet" computers, or the like); mobile phones; watches, glasses, or other wearable computing devices. In the example shown in FIG. 1, client device 200A is depicted as a laptop/notebook computer, client device 200B is depicted as a handheld device, and client device 200C is depicted as a computer workstation. In various embodiments there may be fewer or many more respondent devices than are shown in FIG. 1.

As is described in more detail below, in various embodiments, remote information management server 300 may be a networked computing device generally capable of accepting requests over network 168 e.g. from any one of respondent devices 200A-C and/or other networked computing devices (not shown), and providing responses accordingly. The functional components of an exemplary information management server 300 that remotely supports advanced interactions with various client devices 200A-C are described below in reference to FIG. 3.

As shown, server 300 maintains (in memory 304, e.g.) one or more centrally maintained data tables 110 that may contain at least one record 121 co-owned among human entities depicted as users associated with respective devices 200A-C, at least some of whom own respective dedicated zones 175A-C of the record. If a particular human user "A" is directly editing a field 171A within her zone 175A of record 121 via a browser of her device 200A, for example, another human user "B" may simultaneously edit one or more fields 171B within his zone 175B of record 121 via a browser of his device 200B. See FIGS. 5 and 7.

As shown, each record 121 of table 110 includes one or more inter-zone partitions 193A, 193B signifying different types/degrees of ownership/access. One such partition 193A, for example, signifies that an owner of a zone 175A (user "A" or her department, e.g.) on one side of the partition is able to see and modify her zone but not that of the zone 175B on the other side. Another such partition 193B, for example, signifies that an owner of a zone 175B (user "B" or his department, e.g.) on one side of the partition is able to see and modify his zone but is only able to see (and not modify) any field 171C of the zone 175C on the other side of that partition. In respective variants, either such type of partition 193A, 193B may be one-sided or reciprocal.

As shown, the record 121 being edited (and other records 122 of the table) has a plurality of shared fields 165A-B, including a "key" field 165A that uniquely identifies the record and one or more other fields 165B that provide reference information as exemplified below. The fields in zone 170 are "shared" insofar that all are viewable to co-owners of that record. In some variants, as described below, a privileged user (using device 200C, e.g.) may have authority to review the content of the entire record 121 (in response to data validation errors shown, e.g.). Alternatively or additionally, such a privileged user may also have authority to correct and/or finalize the content of the entire record 121 (respectively in response to data validation errors shown or lack thereof, e.g.).

Figure 2:
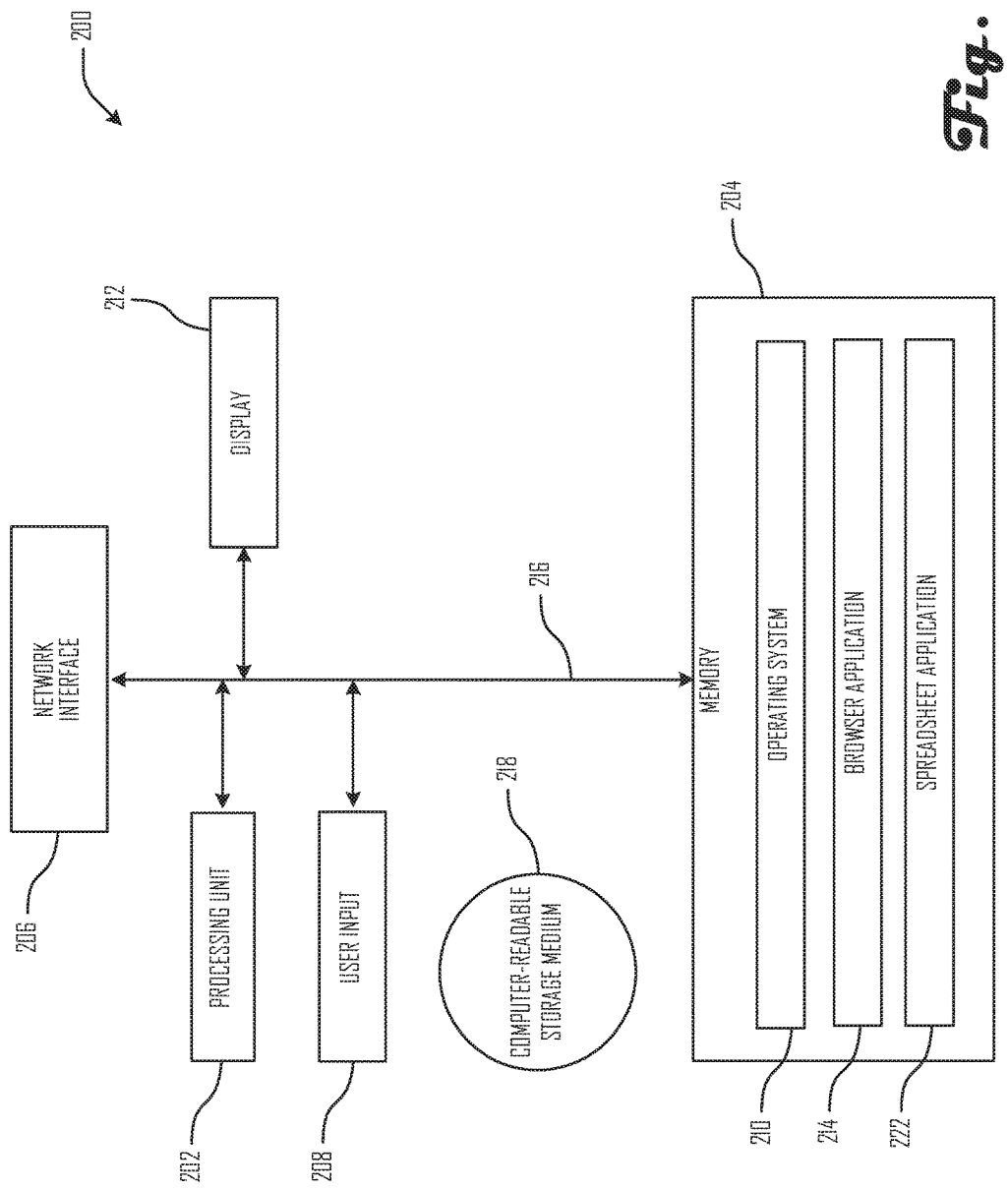
FIG. 2 illustrates a client device in which one or more technologies may be implemented.

FIG. 2 illustrates a client device 200 in which one or more technologies may be implemented. In respective embodiments, client device 200 may be a general-purpose computer or may include special-purpose components not shown. As shown in FIG. 2, exemplary client device 200 includes one or more processing units 202 in data communication with one or more memories 204 via one or more buses 216. Each such memory 204 generally comprises some or all of random access memory (RAM), read-only memory (ROM), and/or a permanent mass storage device, such as a disk drive, flash memory, or the like. Client device 200 may also include one or more instances of network interfaces 206, of user inputs 208, of displays 212, or of speakers (not shown).

As shown, memory 204 of exemplary client device 200 may store an operating system 210, as well as program code for a number of software applications, such as a client web browser application 214. Client web browser application 214 is a software application by which, under server control, client devices can present data to users and transmit data entered by them. These and other software components, as well as various data files (not shown) may be loaded into memory 204 via network interface (optional) 206 (or via a selectively removable computer readable storage medium 218, such as a memory card or the like).

In operation, operating system 210 manages the hardware and software resources of the client device 200 and provides common services for various software applications, such as client web browser application 214. For hardware functions such as network communications via network interface 206, obtaining data via user input 208, rendering data via display 212 and/or speaker, and allocation of memory 204 to various resources, operating system 210 may act as an intermediary between software executing on client device 200 and the client device's hardware.

For example, operating system 210 may cause a representation of locally available software applications, such as client web browser application 214 or spreadsheet application 222, to be rendered locally (via display 212, e.g.). If operating system 210 obtains, e.g. via user input 208, a selection of client web browser application 214, operating system 210 may instantiate a client web browser application 214 process (not shown), i.e. cause processing unit 202 to begin executing the executable instructions of client web browser application 214 and allocate a portion of memory 204 for its use. In some variants, one or more local text editors (in the case of CSV-formatted spreadsheet files, e.g.) or spreadsheet applications (Microsoft Excel, e.g.) may be configured to allow offline editing of a downloaded spreadsheet (as described below, e.g.). Alternatively or additionally, such editing may occur "offline" in the sense that the client device is temporarily disconnected from server 300.

Although an exemplary client device 200 has been described, a client device 200 may be any of a great number of computing devices capable executing program code, such as the program code corresponding to client web browser application 214 or spreadsheet application 222.

Figure 3:
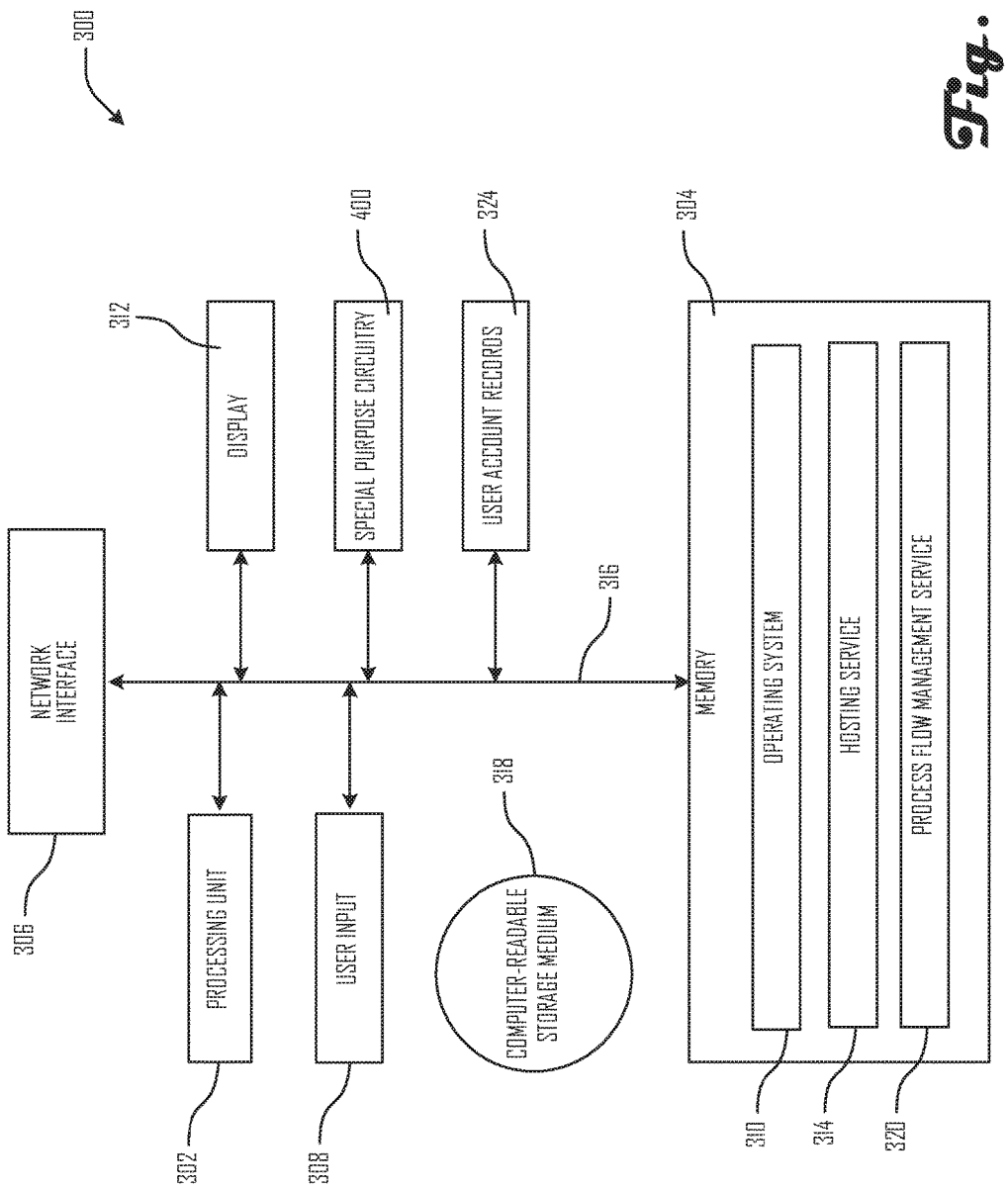
FIG. 3 illustrates a server in which one or more technologies may be implemented.

FIG. 3 illustrates a server 300 in which one or more technologies may be implemented. As shown in FIG. 3, exemplary server 300 includes one or more processing units 302 in data communication with one or more memories 304 via one or more buses 316. Each such memory 304 generally comprises some or all of random access memory (RAM), read-only memory (ROM), and/or a permanent mass storage device, such as a disk drive, flash memory, or the like. Server 300 may also include one or more instances of network interfaces 306, of user inputs 308, of displays 312, or of speakers (not shown).

As shown, memory 304 of exemplary server 300 may store an operating system 310, as well as program code for a number of software applications, such as a hosting service 314. Hosting service 314 is a software application by which, under server control, client devices 200 can present data to users and transmit data from users. Process flow management service 320 is a software application by which one or more routines, such as those described with reference to FIG. 8 or FIG. 9, are coordinated. These and other software components, as well as various data files (not shown) may be loaded into memory 304 via network interface 306 (or via a selectively removable computer readable storage medium 318, such as a memory card or the like).

In operation, operating system 310 manages the hardware and software resources of the server 300 and provides common services for various software applications, such as hosting service 314. For hardware functions such as network communications via network interface 306, obtaining data via user input 308, rendering data via display 312 and/or speaker 316, allocation of memory 304 to various resources, and invoking one or modules of special-purpose circuitry 400, operating system 310 may act as an intermediary between software executing on server 300 and the server's hardware. In some variants, moreover, user account records 324 are maintained in server 300, designating which user accounts are associated with which zones 175 and what privileges each such user account has with regard to other zones, as described herein. Alternatively, in some variants, user account records 324 may reside in memory 304 or in special-purpose circuitry 324.

For example, operating system 310 may cause a representation of locally available software applications, such as hosting service 314 or spreadsheet application 322, to be rendered locally (via display 312, e.g.). If operating system 310 obtains, e.g. via user input 308, a selection of hosting service 314, operating system 310 may instantiate a hosting service 314 process (not shown), i.e. cause processing unit 302 to begin executing the executable instructions of hosting service 314 and allocate a portion of memory 304 for its use. In some variants, one or more local text editors (in the case of comma-separated-value spreadsheet files, e.g.) or spreadsheet applications (Microsoft Excel, e.g.) may be configured to allow offline editing of a downloaded spreadsheet (as described below, e.g.). Alternatively or additionally, such editing may occur "offline" in the sense that the server is temporarily disconnected from server 300.

Although an exemplary server 300 has been described, a server 300 may be any of a great number of computing devices capable executing program code, such as the program code corresponding to hosting service 314 or spreadsheet application 322. Alternatively or additionally, the structures described with reference to FIG. 3 may likewise be implemented by a special-purpose peer computer in a peer-to-peer network.

Figure 4:
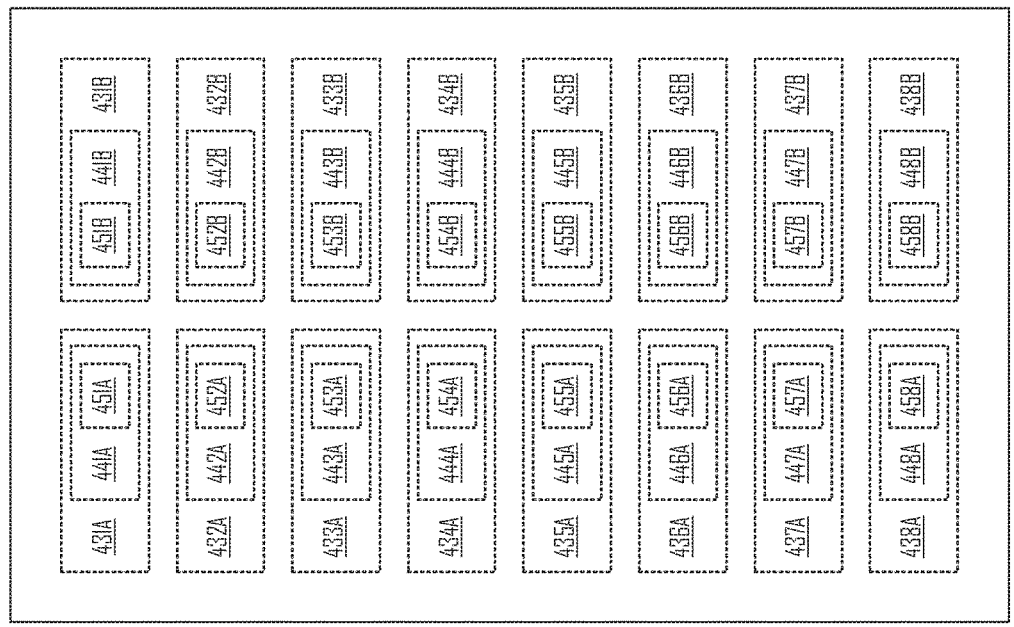
FIG. 4 illustrates an event-sequencing structure comprising special-purpose transistor-based circuitry.

FIG. 4 illustrates special-purpose transistor-based circuitry 400—optionally implemented as an Application-Specific Integrated Circuit (ASIC), e.g.—in which some or all of the functional modules described below may be implemented. Transistor-based circuitry 400 is an event-sequencing structure generally as described in U.S. Pat. Pub. No. 20150094046 but configured as described herein. Transistor-based circuitry 400 includes one or more instances of allocation modules 431A-B, for example, each including an electrical node set 441A-B upon which informational data is represented digitally as a corresponding voltage configuration 451A-B.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 400 further includes one or more instances of configuration modules 432A-B each including an electrical node set 442A-B upon which informational data is represented digitally as a corresponding voltage configuration 452A-B as shown. Transistor-based circuitry 400 further includes one or more instances of download modules 433A-B each including an electrical node set 443A-B upon which informational data is represented digitally as a corresponding voltage configuration 453A-B as shown. Transistor-based circuitry 400 further includes one or more instances of filter modules 434A-B each including an electrical node set 444A-B upon which informational data is represented digitally as a corresponding voltage configuration 454A-B as shown. Transistor-based circuitry 400 further includes one or more instances of control modules 435A-B each including an electrical node set 445A-B upon which informational data is represented digitally as a corresponding voltage configuration 455A-B as shown. Transistor-based circuitry 400 further includes one or more instances of reporting modules 436A-B each including an electrical node set 446A-B upon which informational data is represented digitally as a corresponding voltage configuration 456A-B as shown. Transistor-based circuitry 400 further includes one or more instances of interface modules 437A-B each including an electrical node set 447A-B upon which informational data is represented digitally as a corresponding voltage configuration 457A-B as shown. Transistor-based circuitry 400 further includes one or more instances of upload modules 438A-B each including an electrical node set 448A-B upon which informational data is represented digitally as a corresponding voltage configuration 458A-B as shown. In some variants, as described below in the clauses and claims, such a module implements such functionality jointly (in conjunction with other modules or processing units 302 described herein, e.g.).

FIG. 5 illustrates an instance of a screen display 500 in which one or more technologies may be implemented, one that might be owned by a "Supply Planning Department" or similar human entity. Screen display 500 generated by server 300 via device 200A simultaneously presents, as shown, several instances of user-editable owned fields 171D as well as other user-invokable controls 564A-D. Each owned field has a corresponding label 566A ("MATERIAL GROUP" or "GROSS WEIGHT," e.g.) and an initial value (of "TBD," e.g.). Each "shared" field 165C likewise has an initial/current value and a corresponding label (of "PLANT," e.g.).

FIG. 6 illustrates (an image of) a spreadsheet file 600 with content like that of screen display 500 such as might be produced by a user activating the "EXPORT EXCEL FILE" control 564A depicted in FIG. 5 and then editing some of the values (by replacing "TBD" in the MATERIAL GROUP" and "GROUP WEIGHT" columns 661 and rows 662 with values as shown, e.g.). This can occur, for example, in a context in which the corresponding "UPLOAD EXCEL FILE" control 564B does not have a reciprocal effect. In some contexts, for example, neither labels 566A nor values of shared fields 165C are modified when uploading spreadsheet file 600 by virtue of a filtering operation described below.

Figure 7:
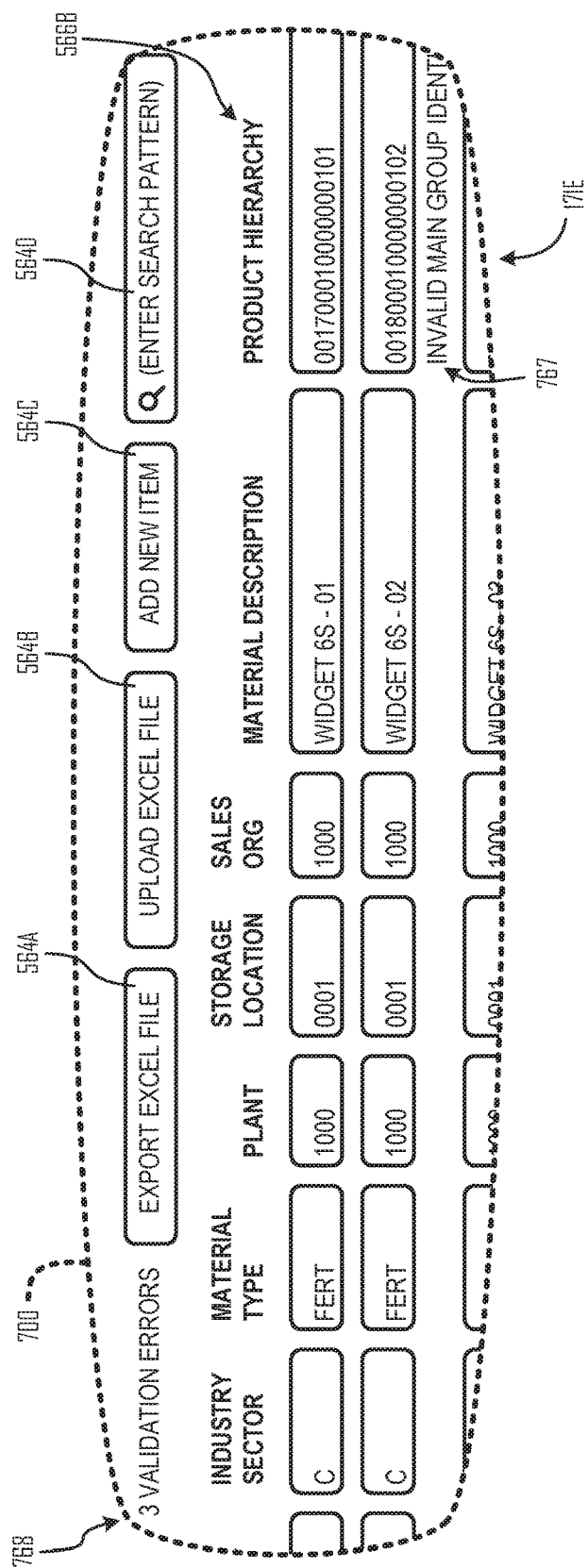
FIG. 7 illustrates another instance of a screen display in which one or more technologies may be implemented.

FIG. 7 illustrates another instance of a screen display 700 in which one or more technologies may be implemented, one that might be owned by an "Operations Finance Department" or similar human entity. Screen display 700 generated by server 300 via device 200B simultaneously presents, as shown, one or more instances of user-editable owned fields 171D as well as user-invokable controls 564A-D. Each owned field has a corresponding label 566B ("PRODUCT HIERARCHY," e.g.) and user-entered 18-digit values, one of which is labeled with an error message 767 (indicating an "INVALID MAIN GROUP IDENTIFIER" in this case, e.g.). This can occur, for example, in a context in which the first 5 digits of the "PRODUCT HIERARCHY" field are the "MAIN GROUP IDENTIFIER," in which "00170" is a valid value and "00180" is not and in which this validation rule violation is one of 3 validation rules currently in table 110 (as indicated by violation-indicative quantification 768 as shown, e.g.).

FIG. 8 illustrates an information management routine 800 suitable for use with at least one embodiment, such as a server 300 having special-purpose circuitry 400. As will be recognized by those having ordinary skill in the art, not all events of information management are illustrated in FIG. 8. Rather, for clarity, only those steps reasonably relevant to describing the tabular data modification aspects of routine 800 are shown and described. Those having ordinary skill in the art will also recognize the present embodiment is merely one exemplary embodiment and that variations on the present embodiment may be made without departing from the scope of the broader inventive concept set forth in the clauses and claims below.

Execution block 805 depicts providing many records in a data table (table 110 of FIG. 1, e.g.). This can occur, for example, in a context in which (an instance of) a configuration module 432A that performs this operation contains an electrical node set 442A upon which a voltage configuration 452A manifests a memory address of table 110 and in which the table is held in memory 304 at that address. Execution then proceeds to block 810.

Execution block 810 depicts giving a "first entity" ownership of the fields of a particular zone "A" including a particular field "A1" (so that a zone 175A including field 171A is owned by a human user "Alice," e.g.). This can occur, for example, in a context in which an allocation module 431A that performs this operation contains an electrical node set 441A upon which a voltage configuration 451A manifests a field identifier (an integer identifier of field 171A, e.g.) mapped to an owner identifier (a username or group name of the user, e.g.). Execution then proceeds to block 815.

Execution block 815 depicts storing field-dependent validation rules (implemented as javascript instruction sequences executable by one or more processing units 302 in browser instances hosted by server 300, e.g.) including a rule specific to the particular field "A1" (field 171A, e.g.). This can occur, for example, in a context in which a configuration module 432B that performs this operation contains an electrical node set 442B upon which a voltage configuration 452B manifests a digital expression of the rule specific to field 171A (comprising one or more of "must be 18 characters" or "must contain only digits" or "must be in the list of permissible values" or other such natural language expression or javascript equivalent, e.g.). Other such field-dependent validation rules (i.e. rules each applicable to a corresponding field but generally not to others) may include conformity to a string matching pattern (having a hyphen in particular positions in a social security or model number, e.g.) or some portions (character subsets, e.g.) belonging to an enumerated set of allowed values (5-digit identifiers embedded in a "PRODUCT HIERARCHY" value and being required to reside in a particular list of "MAIN GROUP IDENTIFIERS" so as to avoid the problem marked by error message 767 in FIG. 7, e.g.). Execution then proceeds to block 825.

Execution block 825 depicts configuring a spreadsheet file containing (an instance of the content of) zone "A" for download after a device used by the first entity is authenticated and a signal manifests a user download request (responsive to a first user activating a "download" button or similar control 564 presented within screen display 500, e.g.). This can occur, for example, in a context in which the spreadsheet file resembles that depicted in FIG. 6 and in which a download module 433A that performs this operation contains an electrical node set 443A upon which a voltage configuration 453A manifests a digital expression of a location identifier designating the download destination (an address of first client device 200A, e.g.). Alternatively or additionally, in some variants, the download module may be configured to transmit to the first device 200A both a preliminary value of the first field ("TBD" as a text string, e.g.) of the first digital record 121 and a first label ("MATERIAL GROUP" as a text string, e.g.) describing the first field of the first digital record in the spreadsheet file. Execution then proceeds to block 830.

Execution block 830 depicts filtering a spreadsheet file received from the first entity to accept zone "A" values selectively into the data table (responsive, in some variants, to "Alice" activating a control 564B within screen display 500, e.g.). This can occur, for example, in a context in which only zone 175A values are accepted in any spreadsheet file received from device 200A, in which any other parts of those spreadsheet files (containing field labels or other unwanted content, e.g.) are not copied from the spreadsheet file into the data table 110, and in which a filter module 434A that performs this filtering contains an electrical node set 444A upon which a voltage configuration 454A manifests a digital expression of an identifier that specifies zone "A" (expressed as a column list or field range that includes the "MATERIAL GROUP" and "GROSS WEIGHT" columns of spreadsheet file 600, e.g.). Execution then proceeds to decision block 845.

At decision block 845, if any spreadsheet field value violates its corresponding field-dependent validation rule, then information management routine 800 proceeds to execution block 860, described below. Otherwise information management routine 800 proceeds to decision block 850. This can occur, for example, in a context in which a control module 435A that performs this decision contains an electrical node set 445A upon which a voltage configuration 455A manifests a Boolean determination (a high voltage on a particular electrical node indicating a violation or a low voltage there indicating no violation, e.g.) or other such digital expression.

At decision block 850, if any zones have not yet been modified or approved by their respective owners, then information management routine 800 proceeds to execution block 865, described below. Otherwise information management routine 800 proceeds to execution block 870. This can occur, for example, in a context in which a control module 435B that performs this decision contains an electrical node set 445B upon which a voltage configuration 455B manifests a Boolean determination (a 3-bit value of "010" indicating that record 121 is complete or any other 3-bit value indicating record 121 is incomplete, e.g.) or other such digital expression and in which browser-resident data validation rules could not otherwise confirm the validity of a scalable offline data configuration by widespread contributors without specialized data-entry training (implemented via incrementing series, user-specified formulae, user-developed macros, and other such locally-implemented data entry techniques known to many spreadsheet users, e.g.) and in which time-sensitive data aggregation (leading up to a product release, e.g.) would otherwise require substantial re-keying (manual data entry via editing fields 171 of a browser interface after each local spreadsheet data configuration, e.g.) to ensure that suitable record zone partitioning (respective ownership of fields in a single record, e.g.) was maintained.

Execution block 860 depicts sending a description of a violated validation rule and an error count (causing a browser of one or more client devices 200 to display a natural language error message 767 and an error count or other violation-indicative quantification 768 as an automatic and conditional response to a rule violation having been detected, e.g.). This can occur, for example, in a context in which a user device uploads a spreadsheet file containing one or more validation rule violations in the device owner's zone and in which a reporting module 436A that performs this operation contains an electrical node set 446A upon which a voltage configuration 456A manifests a digital expression of an integer signaling the quantification concatenated with a suitable text string (as "2 errors detected," e.g.). Execution then proceeds to block 865.

Execution block 865 depicts causing a user to have an opportunity to enter or edit a value of a field (receiving such updates via a form that includes a particular screen display 500 presenting a portion of table 100 in a browser of Alice's device 200A, e.g.). This can occur, for example, in a context in which "TBD" is an abbreviation of "To Be Determined" and is a validation-rule compliant value indicating that the user has not entered an initial value for that field of that record and in which an interface module 437A that performs this operation contains an electrical node set 447A upon which a voltage configuration 457A manifests a text string entered by the user via (an instance of) browser application 214. In some variants, a more stringent validation rule may subsequently apply to the same field value (at operation 925 or operation 935 as described below, e.g.), one in which "TBD" is no longer a compliant value. Information management routine 800 next proceeds to execution block 835.

Execution block 835 depicts configuring a spreadsheet file (containing a zone "B" including field "B1", e.g.) for download after a device used by another entity (device 200B owned by human user "B," e.g.) is authenticated and responsive, in some variants, to that user activating a suitable control (button 564A within screen display 700, e.g.). This can occur, for example, in a context in which a download module 433B that performs this operation contains an electrical node set 443B upon which a voltage configuration 453B manifests a digital expression of a location identifier designating the respective download destinations (one or more addresses of a storage medium 218 of the other user's device, e.g.). Alternatively or additionally, in some variants, the download module may be configured to transmit to the client device(s) a preliminary value of the next field (a default or other value of that field previously entered, e.g.) of the same digital record (record 121 e.g.) and a zone label ("PRODUCT HIERARCHY" as a text string describing a zone "B" field of digital record 121, e.g.). Execution then proceeds to block 840.

Execution block 840 depicts filtering a spreadsheet file received from the other user/entity (to accept zone "B" values selectively into the data table responsive, in some variants, to the user activating a control 564B within screen display 700, e.g.). This can occur, for example, in a context in which only zone 175B values are accepted in any spreadsheet file received from a device operated by user "B," in which any other parts of that one or more spreadsheet files are not copied into the data table 110, and in which a filter module 434B that performs this filtering contains an electrical node set 444B upon which a voltage configuration 454B manifests a digital expression of a cell range identifier that specifies zone "B" (including a start and end of a range owned by user "B" that includes the "PRODUCT HIERARCHY" value of record 121, e.g.). This can occur, for example in a context in which human user "B" has made numerous offline edits to the spreadsheet file including some inadvertent modification of field values owned by someone else and in which the above-described zone ownership and partitioning is desirable to protect other zones 175A, 175C from such modification. Alternatively or additionally, in some variants, the download module 433 may be configured to omit one or more zones 175C of the table 110 from the spreadsheet file extraction for user "B."

Execution block 870 depicts indicating that one or more records in the table are error free (causing a browser of one or more client devices 200 to display a natural language message 768 signaling no validation errors, for example, at least in record 121) as an automatic and conditional response to no rule violation having been detected. This can occur, for example, in a context in which a reporting module 436B that performs this indication contains an electrical node set 446B upon which a voltage configuration 456B manifests an unsigned integer manifesting how many validation rule violations remain and in which field updates occur (in block 865, e.g.) that remove the last validation rule violation (at least in record 121, e.g.). Execution then proceeds to block 875.

Execution block 875 depicts transmitting one or more error-free records in the table to a data repository (responding to the voltage configuration 456B described above manifesting zero validation errors by uploading one or more error-free records 121 to an enterprise resource planning application (SAP, e.g.) or by releasing the records as described below with regard to operations 925, 935, 955, 975 (of FIG. 9). This can occur, for example, in a context in which one or more other records 122 still contain validation errors or in which user "C" selectively finalizes record 121 without finalizing record 122 and in which an upload module 438A that performs this transmission contains an electrical node set 448A upon which a voltage configuration 458A manifests a destination address by which the recipient(s) receive(s) uploaded records and in which many cooperating entities (agencies or departments, e.g.) sharing a single record/row of up-to-the-minute machine-validated data would not otherwise be viable. The information management routine 800 ends at termination block 899.

FIG. 9 illustrates another kind of event flow 900 suitable for use with at least one embodiment, optionally incorporating several instances of information management routine 800 as shown. Alternatively or additionally, event flow 900 may define a system specification for (an instance of) server 300 including transistor-based circuitry 400 tailored to multiple organizations coordinating an ERP system at scale. Shown are several "swim lanes" each associated with an organizational entity to whom programmatic allocations 914A-J (resident in an instance of process flow management service 320, e.g.) assign one or more operations, at least some of which feature ownership of fields as described herein. Allocation 914A, for example, may assign operations 926, 936, 956, 976 to a first human agent (a "Master Data" group or user account, e.g.). Allocation 914B may likewise assign one or more operations 953A to a human agent (an "Operations" group or user account, e.g.). Allocation 914C may likewise assign one or more operations 923A, 953B to a human agent (a "Finance" group or user account, e.g.). Allocation 914D may likewise assign one or more operations 923B to a human agent (a "Supply Planning" group or user account, e.g.). Allocation 914E may likewise assign one or more operations 923C, 973A to a human agent (a "Demand Planning" group or user account, e.g.). Allocation 914F may likewise assign one or more operations 973B to a human agent (a "Customer Service" group or user account, e.g.). Allocation 914G may likewise assign one or more operations 973C to a human agent (a "Transportation" group or user account, e.g.). Allocation 914H may likewise assign one or more operations 933A to a human agent (a "Sourcing" group or user account, e.g.). Allocation 914I may likewise assign one or more operations 933B to a human agent (a "Plant Planning" group or user account, e.g.). Allocation 914J may likewise assign one or more operations 933C to a human agent (a "Quality Assurance" group or user account, e.g.).

Such allocations may occur at execution block 917, for example, in which one or more (instances of) allocation modules 431 and configuration modules 432 (operating jointly, e.g.) are configured as (1) transistor-based circuitry configured to identify several user accounts including a first user account selectively authorized to modify at least a first field 171A and a second user account selectively authorized to modify at least a second field 171B and (2) transistor-based circuitry configured to obtain a plurality of field-dependent validation rules including a first field-dependent validation rule selectively applicable to the first field and a second field-dependent validation rule selectively applicable to the second field. This can occur, for example, in a context in which said first and second fields are each a component of many records in a data table 110 including first and second records 121, 122 of the data table; in which data entry operations 923A-C are performed contemporaneously by respective (instances of) devices 200, and in which automated gating operation 925 automatically and conditionally triggers operation 926 (by notifying one or more devices 200 specified by allocation 914A, e.g.) whenever the last of the contributing data entry operations 923A-C is signaled as complete (by an activation of a "SAVE & ROUTE" button or similar user control 564, e.g.) via a corresponding device (specified by allocation 914C-E as shown, e.g.).

Alternatively or additionally, other modules described above may also be incorporated into this portion of event flow 900. This can occur, for example, in a context in which one or more download modules 433 are configured as transistor-based circuitry configured to transmit to a first remote device 200 associated with said first user account at least a first label 566 describing the first field of the first digital record in a first (instance of) spreadsheet file 600 and also configured to transmit to a second remote device 200 associated with said second user account at least a second label 566 describing the second field of the first digital record in a second spreadsheet file.

In some variants, moreover, one or more filter modules 434 are configured as transistor-based circuitry configured to accept into the data table 110 selectively from the first remote device associated with said first user account (defined by allocation 914D, e.g.) a value of the first field of the first digital record from the first spreadsheet file 600 without accepting the first label from the first spreadsheet file and without accepting the second field of the first digital record from the first spreadsheet file and also configured to accept into the data table selectively from the second remote device associated with said second user account (defined by allocation 914C or allocation 914E, e.g.) a value of the second field of the first digital record from the second spreadsheet file without accepting the second label from the second spreadsheet file and without accepting the first field of the first digital record from the second spreadsheet file, in which the data table is configured so that the values of the first and second fields may both be edited offline. This can occur, for example, in a context in which the data table 110 is partitioned so that the value of the first field 171 may be edited via the first remote device associated with said first user account but not via the second remote device associated with said second user account, in which the data table is also partitioned so that the value of the second field 171 may be edited via the second remote device associated with said second user account but not via the first remote device associated with said first user account, and in which one or more upload modules 438 are configured as transistor-based circuitry configured to cause a recordation of an edited version of the data table 110 (or a validation-rule-compliant subset of many records in the data table) at a server 300 (into a data repository, e.g.).

After a manual or automatic triggering operation 926 signaling approval of the input from operations 923A-C, another instance of one or more allocation modules 431 and configuration modules 432 are configured as (1) transistor-based circuitry configured to identify several user accounts including a first user account selectively authorized to modify at least a first field 171 and a second user account selectively authorized to modify at least a second field 171 and (2) transistor-based circuitry configured to obtain a plurality of field-dependent validation rules including a first field-dependent validation rule selectively applicable to the first field and a second field-dependent validation rule selectively applicable to the second field. This can occur, for example, in a context in which said first and second fields are each a component of many records in a data table 110 including first and second records of the data table; in which data entry operations 933A-C are performed contemporaneously by respective (instances of) devices 200, and in which automated gating operation 935 automatically and conditionally triggers operation 936 whenever the last of the contributing data entry operations 933A-C is signaled as complete via a corresponding device (specified by allocation 914H-J as shown, e.g.).

Alternatively or additionally, other modules described above may also be incorporated into this portion of event flow 900. This can occur, for example, in a context in which one or more download modules 433 are configured as transistor-based circuitry configured to transmit to a first remote device 200 associated with said first user account at least a first label 566 describing the first field of the first digital record in a first (instance of) spreadsheet file 600 and also configured to transmit to a second remote device 200 associated with said second user account at least a second label 566 describing the second field of the first digital record in a second spreadsheet file.

In some variants, moreover, one or more filter modules 434 are configured as transistor-based circuitry configured to accept into the data table 110 selectively from the first remote device associated with said first user account (defined by allocation 914H, e.g.) a value of the first field of the first digital record from the first spreadsheet file 600 without accepting the first label from the first spreadsheet file and without accepting the second field of the first digital record from the first spreadsheet file and also configured to accept into the data table selectively from the second remote device associated with said second user account (defined by allocation 914J, e.g.) a value of the second field of the first digital record from the second spreadsheet file without accepting the second label from the second spreadsheet file and without accepting the first field of the first digital record from the second spreadsheet file, in which the data table is configured so that the values of the first and second fields may both be edited offline. This can occur, for example, in a context in which the data table 110 is partitioned so that the value of the first field 171 may be edited via the first remote device associated with said first user account but not via the second remote device associated with said second user account, in which the data table is also partitioned so that the value of the second field 171 may be edited via the second remote device associated with said second user account but not via the first remote device associated with said first user account, and in which one or more upload modules 438 are configured as transistor-based circuitry configured to cause a recordation of an edited version of the data table 110 (or a validation-rule-compliant subset of many records in the data table) at a server 300 (into a data repository, e.g.).

After a manual or automatic triggering operation 936 signaling approval of the input from operations 933A-C, another instance of one or more allocation modules 431 and configuration modules 432 are configured as (1) transistor-based circuitry configured to identify several user accounts including a first user account selectively authorized to modify at least a first field 171 and a second user account selectively authorized to modify at least a second field 171 and (2) transistor-based circuitry configured to obtain a plurality of field-dependent validation rules including a first field-dependent validation rule selectively applicable to the first field and a second field-dependent validation rule selectively applicable to the second field. This can occur, for example, in a context in which said first and second fields are each a component of many records in a data table 110 including first and second records of the data table; in which data entry operations 953A-B are performed contemporaneously by respective (instances of) devices 200, and in which automated gating operation 955 automatically and conditionally triggers operation 956 whenever the latter of the contributing data entry operations 953A-B is signaled as complete via a corresponding device (specified by allocation 914B-C as shown, e.g.).

Alternatively or additionally, other modules described above may also be incorporated into this portion of event flow 900. This can occur, for example, in a context in which one or more download modules 433 are configured as transistor-based circuitry configured to transmit to a first remote device 200 associated with said first user account at least a first label 566 describing the first field of the first digital record in a first (instance of) spreadsheet file 600 and also configured to transmit to a second remote device 200 associated with said second user account at least a second label 566 describing the second field of the first digital record in a second spreadsheet file.

In some variants, moreover, one or more filter modules 434 are configured as transistor-based circuitry configured to accept into the data table 110 selectively from the first remote device associated with said first user account (defined by allocation 914B, e.g.) a value of the first field of the first digital record from the first spreadsheet file 600 without accepting the first label from the first spreadsheet file and without accepting the second field of the first digital record from the first spreadsheet file and also configured to accept into the data table selectively from the second remote device associated with said second user account (defined by allocation 914C, e.g.) a value of the second field of the first digital record from the second spreadsheet file without accepting the second label from the second spreadsheet file and without accepting the first field of the first digital record from the second spreadsheet file, in which the data table is configured so that the values of the first and second fields may both be edited offline. This can occur, for example, in a context in which the data table 110 is partitioned so that the value of the first field 171 may be edited via the first remote device associated with said first user account but not via the second remote device associated with said second user account, in which the data table is also partitioned so that the value of the second field 171 may be edited via the second remote device associated with said second user account but not via the first remote device associated with said first user account, and in which one or more upload modules 438 are configured as transistor-based circuitry configured to cause a recordation of an edited version of the data table 110 (or a validation-rule-compliant subset of many records in the data table) at a server 300 (into a data repository, e.g.).

After a manual or automatic triggering operation 956 signaling approval of the input from operations 953A-B, another instance of one or more allocation modules 431 and configuration modules 432 are configured as (1) transistor-based circuitry configured to identify several user accounts including a first user account selectively authorized to modify at least a first field 171 and a second user account selectively authorized to modify at least a second field 171 and (2) transistor-based circuitry configured to obtain a plurality of field-dependent validation rules including a first field-dependent validation rule selectively applicable to the first field and a second field-dependent validation rule selectively applicable to the second field. This can occur, for example, in a context in which said first and second fields are each a component of many records in a data table 110 including first and second records of the data table; in which data entry operations 973A-C are performed contemporaneously by respective (instances of) devices 200, and in which automated gating operation 975 automatically and conditionally triggers operation 976 whenever the last of the contributing data entry operations 973A-C is signaled as complete via a corresponding device (specified by allocation 914E-G as shown, e.g.).

Alternatively or additionally, other modules described above may also be incorporated into this portion of event flow 900. This can occur, for example, in a context in which one or more download modules 433 are configured as transistor-based circuitry configured to transmit to a first remote device 200 associated with said first user account at least a first label 566 describing the first field of the first digital record in a first (instance of) spreadsheet file 600 and also configured to transmit to a second remote device 200 associated with said second user account at least a second label 566 describing the second field of the first digital record in a second spreadsheet file.

In some variants, moreover, one or more filter modules 434 are configured as transistor-based circuitry configured to accept into the data table 110 selectively from the first remote device associated with said first user account (defined by allocation 914F, e.g.) a value of the first field of the first digital record from the first spreadsheet file 600 without accepting the first label from the first spreadsheet file and without accepting the second field of the first digital record from the first spreadsheet file and also configured to accept into the data table selectively from the second remote device associated with said second user account (defined by allocation 914G, e.g.) a value of the second field of the first digital record from the second spreadsheet file without accepting the second label from the second spreadsheet file and without accepting the first field of the first digital record from the second spreadsheet file, in which the data table is configured so that the values of the first and second fields may both be edited offline. This can occur, for example, in a context in which the data table 110 is partitioned so that the value of the first field 171 may be edited via the first remote device associated with said first user account but not via the second remote device associated with said second user account, in which the data table is also partitioned so that the value of the second field 171 may be edited via the second remote device associated with said second user account but not via the first remote device associated with said first user account, and in which one or more upload modules 438 are configured as transistor-based circuitry configured to cause a recordation of an edited version of the data table 110 (or a validation-rule-compliant subset of many records into a data repository of an ERP application, e.g.).

It deserves emphasis that many variations in the sequencing or other details of event flow 900 may vary from those presented without any undue experimentation. In light of teachings herein, for example, some variants of transistor-based circuitry 400 may be configured to present an edit field so that authenticated users can select or otherwise modify a value of any field they own such that a field-specific validation rule corresponding to that field is applied immediately, reporting any errors before the spreadsheet download operation (of block 825 or block 835, e.g.) is executed. This can occur, for example, in a context in which an interface module 437B is configured to allow the user to enter the data (received via an instance of a user input 208 of client device 200 and manifested as a voltage configuration 457B on node set 447B in server 300, e.g.), to invoke a validation module that applies the corresponding rule(s), and then to invoke a download module 433 to generate a suitable spreadsheet that manifests the just-entered and validated field value (manifested as a voltage configuration or other binary bit sequence, e.g.).

In light of teachings herein, numerous existing techniques may be applied for configuring special-purpose circuitry or other structures effective for managing table data or for configuring other decisions and devices as described herein without undue experimentation. See, e.g., U.S. Pat. No. 9,305,066 ("System and method for remote data harmonization"); U.S. Pat. No. 9,300,745 ("Dynamic execution environment in network communications"); U.S. Pat. No. 9,275,121 ("Interoperable shared query based on heterogeneous data sources"); U.S. Pat. No. 9,224,163 ("Incremental computation of billing percentile values in a cloud based application acceleration as a service environment"); U.S. Pat. No. 9,203,874 ("Portal multi-device session context preservation"); U.S. Pat. No. 9,195,689 ("Converting structured data into database entries"); U.S. Pat. No. 9,058,188 ("Transformative user interfaces"); U.S. Pat. No. 8,983,972 ("Collection and reporting of customer survey data"); U.S. Pat. No. 8,938,726 ("Integrating native application into web portal"); U.S. Pat. No. 8,924,269 ("Consistent set of interfaces derived from a business object model"); U.S. Pat. No. 8,898,442 ("Scenario-based process modeling for business processes including exception flow to handle an error in a task of the series of tasks"); U.S. Pat. No. 8,719,074 ("Editor and method for editing formulae for calculating the price of a service and a system for automatic costing of a service"); U.S. Pat. No. 8,621,549 ("Enforcing control policies in an information management system"); U.S. Pat. No. 8,413,045 ("Rich browser-based word processor"); and U.S. Pat. Pub. No. 20150094046 ("Mobile device sharing facilitation methods and systems operable in network equipment").

All of the patents and other publications referred to above are incorporated herein by reference generally—including those identified in relation to particular new applications of existing techniques—to the extent not inconsistent herewith. While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

1. An information management system 100 comprising:
transistor-based circuitry configured to identify a first user account selectively authorized to modify at least a first field and a second user account selectively authorized to modify at least a second field, wherein said first and second fields are each a component of many records in a data table including first and second records of the data table;
transistor-based circuitry configured to obtain a plurality of field-dependent validation rules including a first field-dependent validation rule selectively applicable to the first field and a second field-dependent validation rule selectively applicable to the second field;
transistor-based circuitry configured to transmit to a first remote device associated with said first user account at least a first label describing the first field of the first digital record in a first spreadsheet file and also configured to transmit to a second remote device associated with said second user account at least a second label describing the second field of the first digital record in a second spreadsheet file;
transistor-based circuitry configured to accept into the data table selectively from the first remote device associated with said first user account a value of the first field of the first digital record from the first spreadsheet file without accepting the first label from the first spreadsheet file and without accepting the second field of the first digital record from the first spreadsheet file and also configured to accept into the data table selectively from the second remote device associated with said second user account a value of the second field of the first digital record from the second spreadsheet file without accepting the second label from the second spreadsheet file and without accepting the first field of the first digital record from the second spreadsheet file, wherein the data table is configured so that the values of the first and second fields may both be edited simultaneously, wherein the data table is partitioned so that the value of the first field may be edited via the first remote device associated with said first user account but not via the second remote device associated with said second user account and wherein the data table is also partitioned so that the value of the second field may be edited via the second remote device associated with said second user account but not via the first remote device associated with said first user account; and
transistor-based circuitry configured to record an edited version of the data table on a non-transitory computer-readable medium.

2. The information management system 100 of ANY of the System Clause 1 further comprising:
transistor-based circuitry configured to determine that at least the first digital record is complete partly based on input from the first user account selectively authorized to modify the first field and partly based on input from the second user account selectively authorized to modify the second field.

3. The information management system 100 of ANY of the above System Clauses further comprising:

transistor-based circuitry configured to transmit to a browser of the first remote device associated with said first user account both a first validation error count >0 and a conditionally-visible description of the first field-dependent validation rule that both signal that the updated value of the first field violates the first field-dependent validation rule selectively applicable to the first field and also configured to transmit to a browser of the second remote device associated with said second user account both a second validation error count >0 and a conditionally-visible description of the second field-dependent validation rule that both signal that the updated value of the second field violates the second field-dependent validation rule selectively applicable to the second field.

4. The information management system 100 of ANY of the above System Clauses in which the transistor-based circuitry configured to transmit to the first remote device associated with said first user account at least the first label describing the first field of the first digital record in the first spreadsheet file and also configured to transmit to the second remote device associated with said second user account at least the second label describing the second field of the first digital record in the second spreadsheet file comprises:

transistor-based circuitry configured to allow said second user to enter a particular value of the second field of the first digital record via a browser and thereafter to transmit to the first remote device associated with said first user account both a preliminary value of the first field of the first digital record and the first label describing the first field of the first digital record in the first spreadsheet file and also configured to transmit to the second remote device associated with said second user account both the particular value of the second field of the first digital record and the second label describing the second field of the first digital record in the second spreadsheet file.

5. The information management system 100 of ANY of the above System Clauses further comprising:

transistor-based circuitry configured to selectively transmit a validation-rule-compliant subset of the many records in the data table to a data repository of an enterprise resource planning (ERP) application, wherein the data table resides in a browser.

6. An information management method comprising:

invoking the transistor-based circuitry of ANY of the above System Clauses.

7. The information management method of Method Clause 6, further comprising:

implementing the transistor-based circuitry as an application-specific integrated circuit (ASIC).

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An information management method comprising;

invoking circuitry configured to identify a first user account selectively authorized to modify at least a first field and a second user account selectively authorized to modify at least a second field, wherein said first and second fields are each a component of many digital records in a data table including first and second digital records;

invoking circuitry configured to obtain rules including a first field-dependent validation rule selectively applicable to the first field and a second field-dependent validation rule selectively applicable to the second field;

invoking circuitry configured to transmit to a first remote device associated with said first user account at least a first label describing the first field of the first digital record in a first spreadsheet file and also configured to transmit to a second remote device associated with said second user account at least a second label describing the second field of the first digital record in a second spreadsheet file;

invoking circuitry configured to accept into the data table selectively from the first remote device a value of the first field of the first digital record from the first spreadsheet file without accepting the first label from the first spreadsheet file and without accepting the second field of the first digital record from the first spreadsheet file and also configured to accept into the data table selectively from the second remote device a value of the second field of the first digital record from the second spreadsheet file without accepting the second label from the second spreadsheet file and without accepting the first field of the first digital record from the second spreadsheet file, wherein the data table is configured so that the values of the first and second fields may both be edited simultaneously, wherein the data table is partitioned so that the value of the first field may be edited via the first remote device but not via the second remote device and wherein the data table is also partitioned so that the value of the second field may be edited via the second remote device but not via the first remote device, and wherein said value of the first field of the first digital record from the first spreadsheet file at said first remote device and said value of the second field of the first digital record from the second spreadsheet file at said second remote device are both accepted into said data table in a context of a time-sensitive data aggregation and wherein said time-sensitive data aggregation is a preparatory component of a product release; and invoking circuitry configured to record an edited version of said first digital record of the data table on a non-transitory computer-readable data repository as an automatic and conditional response to a determination that said first digital record is error free partly based on a determination that said first field of said first digital record does not violate said first field-dependent validation rule and partly based on a determination that said second field of said first digital record does not violate said second field-dependent validation rule.

2. The information management method of claim 1 further comprising;

invoking transistor-based circuitry configured to determine that at least the first digital record is complete partly based on input from the first user account selectively authorized to modify the first field and partly based on input from the second user account selectively authorized to modify the second field.

3. The information management method of claim 1 further comprising;

before said edited version of said first digital record of the data table is recorded on said non-transitory computer-readable data repository, invoking transistor-based circuitry configured to transmit to a browser of the first remote device both a first validation error count >0 and a conditionally-visible description of the first field-dependent validation rule that both signal that a prior value of the first field violates the first field-dependent validation rule selectively applicable to the first field and also configured to transmit to a browser of the second remote device both a second validation error count >0 and a conditionally-visible description of the second field-dependent validation rule that both signal that a prior value of the second field violates the second field-dependent validation rule selectively applicable to the second field.

4. The information management method of claim 1 in which the invoking transistor-based circuitry configured to transmit to the first remote device at least the first label describing the first field of the first digital record in the first spreadsheet file and also configured to transmit to the second remote device at least the second label describing the second field of the first digital record in the second spreadsheet file comprises;

invoking transistor-based circuitry configured to allow said second user to enter a particular value of the second field of the first digital record via a browser and thereafter invoking transistor-based circuitry configured to transmit to the first remote device both a preliminary value of the first field of the first digital record and the first label describing the first field of the first digital record in the first spreadsheet file and also configured to transmit to the second remote device both the particular value of the second field of the first digital record and the second label describing the second field of the first digital record in the second spreadsheet file.

5. The information management method of claim 1 further comprising;

invoking transistor-based circuitry configured to selectively transmit a validation-rule-compliant subset of the many records in the data table to a data repository of an enterprise resource planning (ERP) application, wherein the data table resides in a browser.

6. The information management method of claim 1, wherein said determination that said first digital record is error free is partly based on a determination that a third field of said first digital record has been modified and approved by an owner of said third field of said first digital record and wherein said owner does not own said first and second fields of said first digital record.

7. The information management method of claim 1, wherein automatic validation rules respectively correspond to the plurality of field-dependent validation rules at the first and second remote devices so as to provide remote device validation of data entry by widespread contributors simultaneously working on respective partitioned portions of said first field.

8. The information management method of claim 1, wherein automatic validation rules respectively correspond to the plurality of field-dependent validation rules at the first and second remote devices so as to provide remote device validation of data entry by widespread contributors simultaneously working on respective partitioned portions of said first field and wherein record zone partitioning maintains respective ownership among said widespread contributors simultaneously working on said respective partitioned portions of said first record without requiring specialized data-entry training and wherein many cooperating entities that include said widespread contributors are thereby able to share said first record with up-to-the-minute machine-validated data entry shared among said remote devices.

9. The information management method of claim 1, wherein said value of said first field of said first digital record from said first spreadsheet file was generated by one or more user-specified formulae in said first spreadsheet file in said first remote device.

10. The information management method of claim 1, wherein said value of said first field of said first digital record from said first spreadsheet file was generated using one or more user-developed macros or other locally-implemented automatic data entry techniques in said first spreadsheet file.

11. The information management method of claim 1 further comprising;

before said edited version of said first digital record of the data table is recorded on said non-transitory computer-readable data repository, invoking transistor-based circuitry configured to transmit to a browser of the first remote device both a first validation error count >0 and a conditionally-visible description of the first field-dependent validation rule that both signal that a prior value of the first field violates the first field-dependent validation rule selectively applicable to the first field before the value from the first remote device replaces the first value of the first field.

12. An information management system comprising;

transistor-based circuitry configured to identify a first user account selectively authorized to modify at least a first field and a second user account selectively authorized to modify at least a second field, wherein said first and second fields are each a component of many digital records in a data table including first and second digital records of the data table;

transistor-based circuitry configured to obtain a plurality of field-dependent validation rules including a first field-dependent validation rule selectively applicable to the first field and a second field-dependent validation rule selectively applicable to the second field;

transistor-based circuitry configured to transmit to a first remote device associated with said first user account at least a first label describing the first field of the first digital record in a first spreadsheet file and also configured to transmit to a second remote device associated with said second user account at least a second label describing the second field of the first digital record in a second spreadsheet file;

transistor-based circuitry configured to accept into the data table selectively from the first remote device associated with said first user account a value of the first field of the first digital record from the first spreadsheet file without accepting the first label from the first spreadsheet file and without accepting the second field of the first digital record from the first spreadsheet file and also configured to accept into the data table selectively from the second remote device associated with said second user account a value of the second field of the first digital record from the second spreadsheet file without accepting the second label from the second spreadsheet file and without accepting the first field of the first digital record from the second spreadsheet file, wherein the data table is configured so that the values of the first and second fields may both be edited simultaneously, wherein the data table is partitioned so that the value of the first field may be edited via the first remote device associated with said first user account but not via the second remote device associated with said second user account and wherein the data table is also partitioned so that the value of the second field may be edited via the second remote device associated with said second user account but not via the first remote device associated with said first user account, and wherein said value of the first field of the first digital record from the first spreadsheet file at said first remote device and said value of the second field of the first digital record from the second spreadsheet file at said second remote device are both accepted into said data table in a context of a time-sensitive data aggregation and wherein said time-sensitive data aggregation is a preparatory component of a product release; and transistor-based circuitry configured to record an edited version of said first digital record of the data table on a non-transitory computer-readable data repository as an automatic and conditional response to a determination that said first digital record is error free partly based on a determination that said first field of said first digital record does not violate said first field-dependent validation rule and partly based on a determination that said second field of said first digital record does not violate said second field-dependent validation rule.

13. The information management system of claim 12 further comprising;
transistor-based circuitry configured to determine that at least the first digital record is complete partly based on input from the first user account selectively authorized to modify the first field and partly based on input from the second user account selectively authorized to modify the second field.

14. The information management system of claim 12 further comprising;
transistor-based circuitry configured to transmit to a browser of the first remote device associated with said first user account, before said edited version of said first digital record of the data table is recorded on said non-transitory computer-readable data repository, both a first validation error count >0 and a conditionally-visible description of the first field-dependent validation rule that both signal that a prior value of the first field violates the first field-dependent validation rule selectively applicable to the first field and also configured to transmit to a browser of the second remote device associated with said second user account both a second validation error count >0 and a conditionally-visible description of the second field-dependent validation rule that both signal that a prior value of the second field violates the second field-dependent validation rule selectively applicable to the second field.

15. The information management system of claim 12 in which the transistor-based circuitry configured to transmit to the first remote device associated with said first user account at least the first label describing the first field of the first digital record in the first spreadsheet file and also configured to transmit to the second remote device associated with said second user account at least the second label describing the second field of the first digital record in the second spreadsheet file comprises;
transistor-based circuitry configured to allow said second user to enter a particular value of the second field of the first digital record via a browser and thereafter to transmit to the first remote device associated with said first user account both a preliminary value of the first field of the first digital record and the first label describing the first field of the first digital record in the first spreadsheet file and also to transmit to the second remote device associated with said second user account both the particular value of the second field of the first digital record and the second label describing the second field of the first digital record in the second spreadsheet file.

16. The information management system of claim 12 further comprising;
transistor-based circuitry configured to selectively transmit a validation-rule-compliant subset of the many records in the data table to a data repository of an enterprise resource planning (ERP) application, wherein the data table resides in a browser.

17. The information management system of claim 12, further comprising a control module configured to obtain a Boolean determination whether or not any zones of said first digital record have not yet been approved by their respective owners.

18. The information management system of claim 12 further comprising;
transistor-based circuitry configured to transmit to a browser of the first remote device associated with said first user account, before said edited version of said first digital record of the data table is recorded on said non-transitory computer-readable data repository, both a first validation error count >0 and a conditionally-visible description of the first field-dependent validation rule that both signal that a prior value of the first field violates the first field-dependent validation rule selectively applicable to the first field.

19. An information management system comprising;
means for identifying a first user account selectively authorized to modify at least a first field and a second user account selectively authorized to modify at least a second field, wherein said first and second fields are each a component of many digital records in a data table including first and second digital records;
means for obtaining rules including a first field-dependent validation rule selectively applicable to the first field and a second field-dependent validation rule selectively applicable to the second field;
means for transmitting to a first remote device associated with said first user account at least a first label describing the first field of the first digital record in a first spreadsheet file and also for transmitting to a second remote device associated with said second user account at least a second label describing the second field of the first digital record in a second spreadsheet file;
means for accepting into the data table selectively from the first remote device a value of the first field of the first digital record from the first spreadsheet file without accepting the first label from the first spreadsheet file and without accepting the second field of the first digital record from the first spreadsheet file and for accepting into the data table selectively from the second remote device a value of the second field of the first digital record from the second spreadsheet file without accepting the second label from the second spreadsheet file and without accepting the first field of the first digital record from the second spreadsheet file, wherein the data table is configured so that the values of the first and second fields may both be edited simultaneously, wherein the data table is partitioned so that the value of the first field may be edited via the first remote device but not via the second remote device and wherein the data table is also partitioned so that the value of the second field may be edited via the second remote device but not via the first remote device, and wherein said value of the first field of the first digital record from the first spreadsheet file at said first remote device and said value of the second field of the first digital record from the second spreadsheet file at said second remote device are both accepted into said data table in a context of a time-sensitive data aggregation and wherein said time-sensitive data aggregation is a preparatory component of a product release; and means for recording an edited version of the data table on a non-transitory computer-readable data repository as an automatic and conditional response to a determination that said first digital record is error free partly based on a determination that said first field of said first digital record does not violate said first field-dependent validation rule and partly based on a determination that said second field of said first digital record does not violate said second field-dependent validation rule.

20. The information management system of claim 19, wherein record zone partitioning maintains respective ownership among said widespread contributors simultaneously working on said respective partitioned portions of said first record without requiring specialized data-entry training and wherein many cooperating entities that include said widespread contributors are thereby able to share said first record with up-to-the-minute machine-validated data entry shared among said remote devices.

* * * * *